(No Model.)
H. WILSON.
PROPELLING ATTACHMENT FOR GARDEN OR LIKE IMPLEMENTS.
No. 535,650. Patented Mar. 12, 1895.
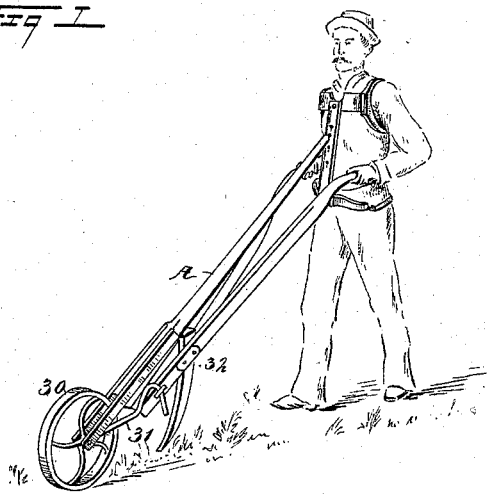
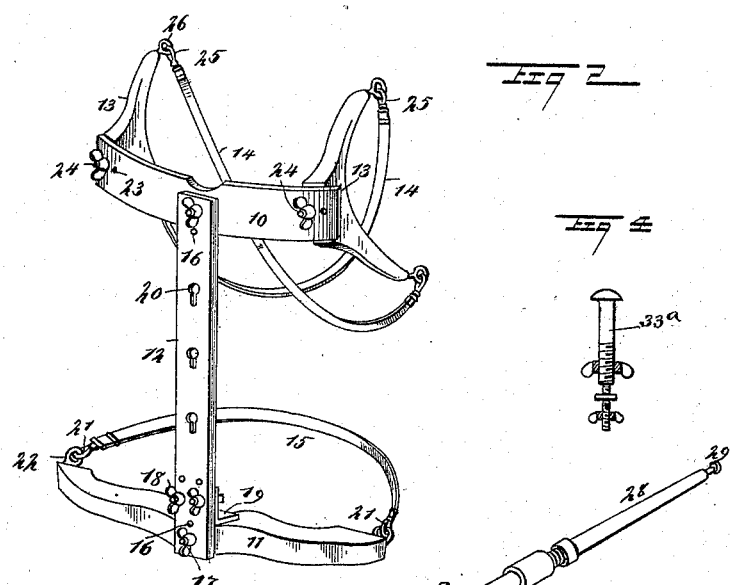
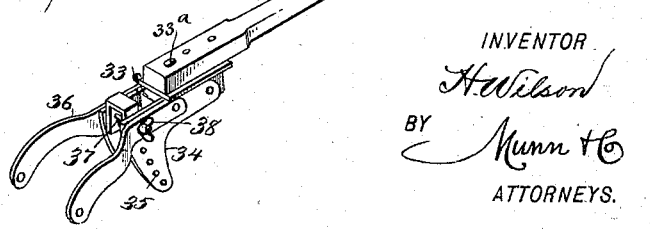
WITNESSES:
H. Walker
C. Sedgwick
INVENTOR
H. Wilson
BY
Munn & Co
ATTORNEYS.

UNITED STATES PATENT OFFICE.

HAMPDEN WILSON, OF CROCKETT, TEXAS.

PROPELLING ATTACHMENT FOR GARDEN OR LIKE IMPLEMENTS.

SPECIFICATION forming part of Letters Patent No. 535,650, dated March 12, 1895.

Application filed May 20, 1893. Serial No. 474,895. (No model.)

*To all whom it may concern:*

Be it known that I, HAMPDEN WILSON, of Crockett, in the county of Houston and State of Texas, have invented a new and Improved Propelling Attachment for Garden or Like Implements, of which the following is a full, clear, and exact description.

My invention relates to a propelling attachment for garden and like implements, and it has for its object to provide a harness so constructed that it may be comfortably worn by the operator, male or female, and further to provide an adjustable attachment between the harness and the implement or machine to be propelled, the attachment between the harness and the implement or machine, being so made that all the force or weight that the operator is capable of exerting may be brought to bear upon the implement to propel it, without unduly fatiguing the operator or rendering the work disagreeable, and whereby further the work of propelling the implement or machine will be beneficial to the operator, inasmuch as the harness will compel the operator to assume an upright position and expand the lungs. Thus the exercise requisite to accomplish the work is one that will be greatly beneficial to health. Furthermore the harness is so applied as to suit people of different stature, and the hands of the operator will be left free to guide the machine or implement in a proper manner.

The attachment is capable of being applied to a lawn mower, wheel-barrow, garden cultivator, a rake, or other form of machine or implement used around the garden.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a perspective view of a garden cultivator or plow, illustrating the application of the improvement thereto, and likewise illustrating the manner of working with the improvement. Fig. 2 is a perspective view of the harness adapted to be worn by the operator. Fig. 3 is a perspective view of one form of push bar employed in connection with the harness; and Fig. 4 is a detail view of a bolt used in connection with the push bar.

The harness is best illustrated in Fig. 2, and it comprises a breast piece 10, a hip bar 11, and a connecting bar 12, uniting the breast piece with the hip bar. In addition to these three pieces the harness consists further of shoulder sockets 13, adjustably connected with the breast piece, and shoulder straps 14, carried by the sockets, together with a hip or waist strap 15, connected with the hip bar. The connecting bar 12, the breast piece, hip bar and shoulder sockets may be made of any material. A material which combines strength with lightness, however, is preferred. Ordinarily the said pieces are constructed of wood or a like material, or a combination of wood and metal, while the straps may be made of leather, canvas, webbing, or similar material.

The breast piece is curved in order that it may not rest against the chest but bear against the shoulders, as shown in Fig. 1, and the hip bar 11, is curved upon its inner face in such manner as to rest easily upon the front of the thighs just below the hips, or at a point above the hips if such an adjustment is desired.

The connecting bar 12, is secured upon the outer faces of the breast and hip bars, and the connecting bar is preferably provided with a series of apertures 16, located near its ends and adjacent to its ends, which apertures are adapted to receive bolts 17, carrying thumb nuts 18, which bolts are passed respectively through the breast piece and the hip bar as well as through the connecting bar. Thus it will be readily observed that the hip bar and breast piece may be adjusted to and from one another, according to the stature of the operator, and the points of the body against which the bars are preferred to bear.

Where the connecting bar joins the hip bar a brace plate 19, is preferably attached to the upper surface of the hip bar, said brace plate being of essentially angular construction, and sundry of the lower bolts 17, are passed through this brace plate before being passed through the connecting bar. The connecting bar is likewise provided with a series of slots 20, arranged longitudinally therein, and the slots are preferably made of the key-hole pattern and are adapted to receive a push bar A, to be hereinafter particularly described.

The hip strap 15, is provided at each of its ends with snaps 21, or the equivalents thereof, the said snaps being adapted to enter eyes 22, or their equivalents, located at the ends of the hip bar. The shoulder sockets 15, are provided with a semi-circular or curved rear face, and their forward faces engage with the inner surface of the breast piece 10, near the end portions thereof. The shoulder sockets are rendered adjustable upon the breast piece by producing in the latter apertures 23, adapted to receive bolts 24, passed through the sockets, and the said bolts are provided with clamping heads, wing nuts or nuts of like construction, whereby a quick adjustment may be effected. The shoulder straps 14, are provided at their ends with clips 25, and these clips are engaged with eyes 26, or like devices, carried at the upper and lower ends of the shoulder sockets, each strap being connected with the upper end of one socket and the lower end of the opposing socket, whereby the straps will cross one another, as shown in Fig. 2.

The push bar A, which is used in connection with the harness is shown in detail in Fig. 3. It is preferably made in two sections 27 and 28, the sections being adjustably connected so that the bar may be lengthened or shortened as occasion may demand. The upper or rear end of the bar is provided with a pin or stud 29, the head of which is entered in the larger portion of one of the key-hole slots 20, and when the shank of the pin or stud is permitted to drop in the narrower portion of the slot, the head of the pin or post will prevent the bar being disengaged from the harness; but the bar may be readily removed by simply drawing it upward and the operator backing.

In Fig. 1 the push bar is illustrated as having a bifurcated lower or forward end, and between the members of this end a wheel 30, is pivoted, while the lower portion of the push bar is illustrated as connected by links 31 with the frame of a plow 32.

In Fig. 3 the push bar is illustrated as adjustably placed at its lower or forward end upon a block 33, and this block has secured to its sides angular plates 34, the forward end of the plates curving downward some distance below the block, and the downwardly-extending portions of the plates 34, are provided with apertures 35, for the vertical adjustment of arms 36, which arms may be connected with the wheel of a barrow, or other implement carrying a wheel; or a wheel may be pivoted between the arms and the push bar may be made adjustable to an upper or lower position, that is, to a greater or less height from the ground, by adjusting the arms 36 upon the adjusting plates 34, the adjustment being accomplished through the medium of a bolt 37, provided with a nut 38, preferably a thumb or wing nut.

The bolt which serves to connect the push bar A, with the block 33, is shown in Fig. 4 and is designated as 33ª. It is a right and left hand threaded bolt, one threaded surface being of less diameter than the other and each surface is preferably provided with a nut, ordinarily a winged nut, and a washer is placed between the nuts, adapted to engage with the shoulder produced by the two diameters of the bolt. A bolt of this description is capable of forming a pivoted or hinged connection between the push bar and the block, and this feature will be of great utility when the device is used in connection with garden wheel hoes designed to cultivate plants in hills. Such an implement straddles the rows of small plants, and two hoes are employed, one slightly in advance of the other, the hoes being located upon opposite sides of the machine. If such an implement is pushed straight forward every part of the row will be cultivated, but when the forward hoe closely approaches the plant the implement by means of the handle and the pivoted bolt connection 33ª in the push bar, may be pushed to one side to let the forward hoe pass the plant, and then turned immediately to the other side, in order to let the rear hoe pass, thereby leaving the plant in a small diamond-shaped undisturbed space.

In placing the harness upon the body the breast piece is made to engage with the breast of the operator, and the hip bar is adjusted to cause it to bear upon the body at the front of the thighs just below the hips, or at any other desired portion. The shoulder sockets are adjusted upon the breast piece to suit the operator, and are then secured to place. The shoulder straps after being crossed over the back are connected with the ends of the shoulder sockets, and next the hip strap is secured at both of its ends to the hip bar, and after the push bar has been secured to the implement to be operated it is connected with the connecting bar, or vertical central section of the harness in the manner heretofore stated. Thus it is evident that both hands of the operator are left entirely free to guide the implement or machine, while all the power the operator is capable of exerting may be carried directly against the implement to propel it in a forwardly direction, and as the harness distributes the strain over a large area of the body, a person using the harness may accomplish much more work than it is possible to do without it, and without tiring nearly so soon. Furthermore, the harness compels the body to be kept in an upright position, so that the lungs are constantly expanded, and the exercise is rendered exceedingly beneficial. It is likewise evident that as there is a pivotal connection between the push bar and the harness, the operator may stoop without inconvenience, for the purpose of removing weeds or other obstructions that may be within his path.

Having thus described my invention, I claim as new and desire to secure by Letters Patent—

1. A harness for the purpose described, the same comprising a hip and a breast bar, a brace bar for connecting the two, means for adjusting the hip and breast bar at different distances from each other, and means, substantially as set forth, for fitting the hip and the breast bar to the body, as and for the purpose specified.

2. A harness for the purpose described, the same comprising a hip and a breast bar and a connection between the two, shoulder sockets located upon the ends of the breast bar, and straps connected with the sockets and hip bar, as and for the purpose specified.

3. A harness for the purpose described, comprising a breast and hip bar adjustably connected with a brace bar, shoulder sockets located upon the breast bar, shoulder straps carried by the shoulder sockets, and a hip strap connected with the hip bar, as and for the purpose set forth.

4. A harness for the purpose described, the same comprising a breast and hip bar, a connecting bar uniting the same, shoulder sockets, straps connected with the sockets and with the hip bar, and a push bar connected with the harness between the hip and breast bars, as and for the purpose specified.

5. In a device for propelling garden and like implements, the combination, with a harness comprising a breast and hip bar, a connection between the two, and shoulder straps connected with the breast bar, of a push bar removably and adjustably connected with the harness between the breast and hip bars, one portion of the push bar being fitted for attachment to the machine or implement to be propelled, as set forth.

HAMPDEN WILSON.

Witnesses:
A. J. C. DENMAN,
G. M. DALLES.